United States Patent
Yasui et al.

(10) Patent No.: US 11,914,386 B2
(45) Date of Patent: Feb. 27, 2024

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Yuji Yasui, Wako (JP); Gakuyo Fujimoto, Wako (JP); Misako Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 17/215,087

(22) Filed: Mar. 29, 2021

(65) Prior Publication Data

US 2021/0302982 A1 Sep. 30, 2021

(30) Foreign Application Priority Data

Mar. 30, 2020 (JP) .................................. 2020-060470

(51) Int. Cl.
*G05D 1/02* (2020.01)
*B60W 60/00* (2020.01)
*G05D 1/00* (2006.01)

(52) U.S. Cl.
CPC ....... *G05D 1/0221* (2013.01); *B60W 60/0011* (2020.02); *B60W 2556/10* (2020.02); *B60W 2710/18* (2013.01); *B60W 2710/20* (2013.01)

(58) Field of Classification Search
CPC ......... B60T 2201/022; B60T 2201/024; G05D 1/0221
See application file for complete search history.

(56) References Cited

U.S. PATENT DOCUMENTS

| 10,303,178 B1 * | 5/2019 | Gutmann | B60W 30/09 |
| 11,016,493 B2 * | 5/2021 | Taylor | G05D 1/0214 |

(Continued)

FOREIGN PATENT DOCUMENTS

| JP | 2017-159790 | 9/2017 |
| JP | 2017-207964 | 11/2017 |

(Continued)

OTHER PUBLICATIONS

Chinese Office Action for Chinese Patent Application No. 202110316821.6 dated Aug. 9, 2023.

(Continued)

*Primary Examiner* — Jeff A Burke
*Assistant Examiner* — Jerrod Irvin Davis
(74) *Attorney, Agent, or Firm* — Amin, Turocy & Watson, LLP

(57) ABSTRACT

A mobile object control device includes a first controller that recognizes a surrounding situation of a mobile object based on an output of a detection device having a space around the mobile object as a detection range and generates a first movement plan for the mobile object in a first period based on the recognized surrounding situation of the mobile object, and a second controller that generates a second movement plan for the mobile object in a second period shorter than the first period, and when the second controller generates label data in which label information indicating different values depending on at least the presence or absence of a moving object is imparted to each of division elements obtained by dividing the space around the mobile object into a finite number, and generates the second movement plan based on the label data.

12 Claims, 9 Drawing Sheets

(56) References Cited

U.S. PATENT DOCUMENTS

| | | | |
|---|---|---|---|
| 11,409,295 B1* | 8/2022 | Samdaria | G01C 21/383 |
| 2017/0083021 A1* | 3/2017 | Balaghiasefi | G05D 1/0274 |
| 2018/0267540 A1* | 9/2018 | Sonoura | G05D 1/024 |
| 2019/0113927 A1* | 4/2019 | England | G06N 5/046 |
| 2019/0161080 A1 | 5/2019 | Gochev et al. | |
| 2019/0205765 A1* | 7/2019 | Mondello | G06V 10/7788 |
| 2019/0212749 A1* | 7/2019 | Chen | B60W 30/18154 |
| 2020/0057447 A1 | 2/2020 | Kato et al. | |
| 2020/0117912 A1* | 4/2020 | Thompson | G06T 7/70 |
| 2020/0218269 A1 | 7/2020 | Kanoh et al. | |
| 2020/0284912 A1* | 9/2020 | Bush | G06V 20/597 |
| 2021/0183099 A1* | 6/2021 | Fujii | G06T 7/248 |
| 2023/0074368 A1* | 3/2023 | Rankawat | G06V 20/58 |

FOREIGN PATENT DOCUMENTS

| | | |
|---|---|---|
| JP | 2019-125345 | 7/2019 |
| JP | 2019-144668 | 8/2019 |
| WO | 2018/073887 | 4/2018 |
| WO | 2019/073578 | 4/2019 |

OTHER PUBLICATIONS

Japanese Office Action for Japanese Patent Application No. 2020-060470 dated Oct. 3, 2023.

\* cited by examiner

FIG. 4

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2020-060470 filed on Mar. 30, 2020, the content of which is incorporated herein by reference.

BACKGROUND

Field of the Invention

The present invention relates to a mobile object control device, a mobile object control method, and a storage medium.

Description of Related Art

In recent years, research and practical application of an automated driving technology for causing a vehicle to automatically travel regardless of a driving operation by a driver are underway (Japanese Unexamined Patent Application, First Publication No. 2019-144668).

SUMMARY

In automated driving or advanced driving assistance, there is a problem that it becomes difficult to perform rapid control due to the complexity of information processing. This is the same not only in a vehicle, but also in movement control for a mobile object that moves autonomously.

The present invention has been made in consideration of such circumstances, and an object of the present invention is to provide a mobile object control device, a mobile object control method, and a storage medium capable of rapidly performing necessary control according to a scene.

The mobile object control device, the mobile object control method, and the storage medium according to the present invention have the following configurations.

(1) A mobile object control device including: a storage device configured to store a program; and a hardware processor, wherein the hardware processor recognizes a surrounding situation of a mobile object based on an output of a detection device having a space around the mobile object as a detection range, generates a first movement plan for the mobile object in a first period based on the recognized surrounding situation of the mobile object, and generates a second movement plan for the mobile object in a second period shorter than the first period, by executing the program stored in the storage device, and when the hardware processor generates the second movement plan, the hardware processor generates label data in which label information indicating different values depending on at least the presence or absence of a moving object is imparted to each of division elements obtained by dividing the space around the mobile object into a finite number, and generates the second movement plan based on the label data.

(2) In the aspect (1), the hardware processor imparts the label information having different values to the moving object, a non-travelable area, and a travelable area in the label data.

(3) In the aspect (1), the hardware processor generates the label data in a second period.

(4) In the aspect (1), the hardware processor uses the second movement plan for movement control for the mobile object in preference to the first movement plan at least in a predetermined scene.

(5) In the aspect (1), when input data including the label data is input, the hardware processor inputs the generated label data to a model learned to output a movement plan for avoiding contact with the moving object to acquire the second movement plan.

(6) In the aspect (5), the input data includes latest label data generated most recently, past label data generated in the past, and future label data expected to indicate a future state.

(7) In the aspect (6), the input data includes the past label data corresponding to a period longer in time than the future label data.

(8) In the aspect (6), the input data includes the past label data corresponding to a period longer in time than the first period.

(9) In the aspect (6), the input data includes the future label data corresponding to a period shorter in time than the first period.

(10) In the aspect (5), the hardware processor determines whether or not the input data indicates a known scene, performs movement control for the mobile object based on the second movement plan output by the model when the hardware processor determines that the input data indicates the known scene, and performs movement control for exclusively outputting a braking force without performing steering control for the mobile object, or movement control limited in comparison with a case in which the hardware processor determines that a degree of the steering control indicates the known scene when the hardware processor determines that the input data does not indicate the known scene.

(11) In the aspect (5), the model is a model in which parameters are learned by reinforcement learning based on a reward calculated using a reward function for evaluating an output of the model.

(12) Another aspect of the present invention is a mobile object control method including: executing, by a computer, a first process of recognizing a surrounding situation of a mobile object based on an output of a detection device having a space around the mobile object as a detection range and generating a first movement plan for the mobile object in a first period based on the recognized surrounding situation of the mobile object; and executing, by the computer, a second process of generating a second movement plan for the mobile object in a second period shorter than the first period, wherein the second process is a process of generating, in the second period, label data in which label information indicating different values depending on at least the presence or absence of a moving object is imparted to each of division elements obtained by dividing the space around the mobile object into a finite number, and generating the second movement plan based on the label data.

(13) Yet another aspect of the present invention is a mobile object control device including: a storage device that stores a program, and a hardware processor, wherein the hardware processor performs movement control for a mobile object based on an output of a detection device having a space around the mobile object as a detection range by executing the program stored in the storage device, the hardware processor inputs input data based on the output of the detection device to a model learned to output a movement plan for curbing contact with a moving object when input data is input, to acquire the movement plan, the hardware processor determines whether or not the input data input to the model indicates a known scene, and the hardware processor performs movement control for the mobile object based on the movement plan output by the model when the hardware processor determines that the input data indicates the known scene, and performs movement control for exclusively outputting a braking force without performing steering control for the mobile object, or movement control limited in comparison with a case in which the hardware processor determines that a degree of the steering control indicates the known scene when the hardware processor determines that the input data does not indicate the known scene.

(14) In the aspect (13), the model is a model in which parameters are learned by reinforcement learning based on a reward calculated using a reward function for evaluating the output of the model.

According to the above aspects (1) to (12), it is possible to rapidly perform necessary control according to a scene.

According to the above aspects (13) and (14), it is possible to curb occurrence of an unexpected behavior due to a model, whereas it is difficult to predict results unless a scene is known when control is performed using the model in the related art.

BRIEF DESCRIPTION OF THE DRAWINGS

FIG. 4 is a diagram illustrating an example of label data.

DESCRIPTION OF EMBODIMENTS

Hereinafter, embodiments of a mobile object control device, a mobile object control method, and a storage medium of the present invention will be described with reference to the drawings. A mobile object is a structure that can autonomously move through a driving mechanism included in the mobile object, such as a vehicle, an autonomous walking robot, or a drone. Hereinafter, a configuration and function for exclusively causing a vehicle to move on the ground on the assumption that a mobile object is the vehicle that moves on the ground will be described, but it may be assumed that a configuration and a function for moving a three-dimensional space are included in a flying object such as a drone when the mobile object is the flying object.

[Overall Configuration]

Figure 1:
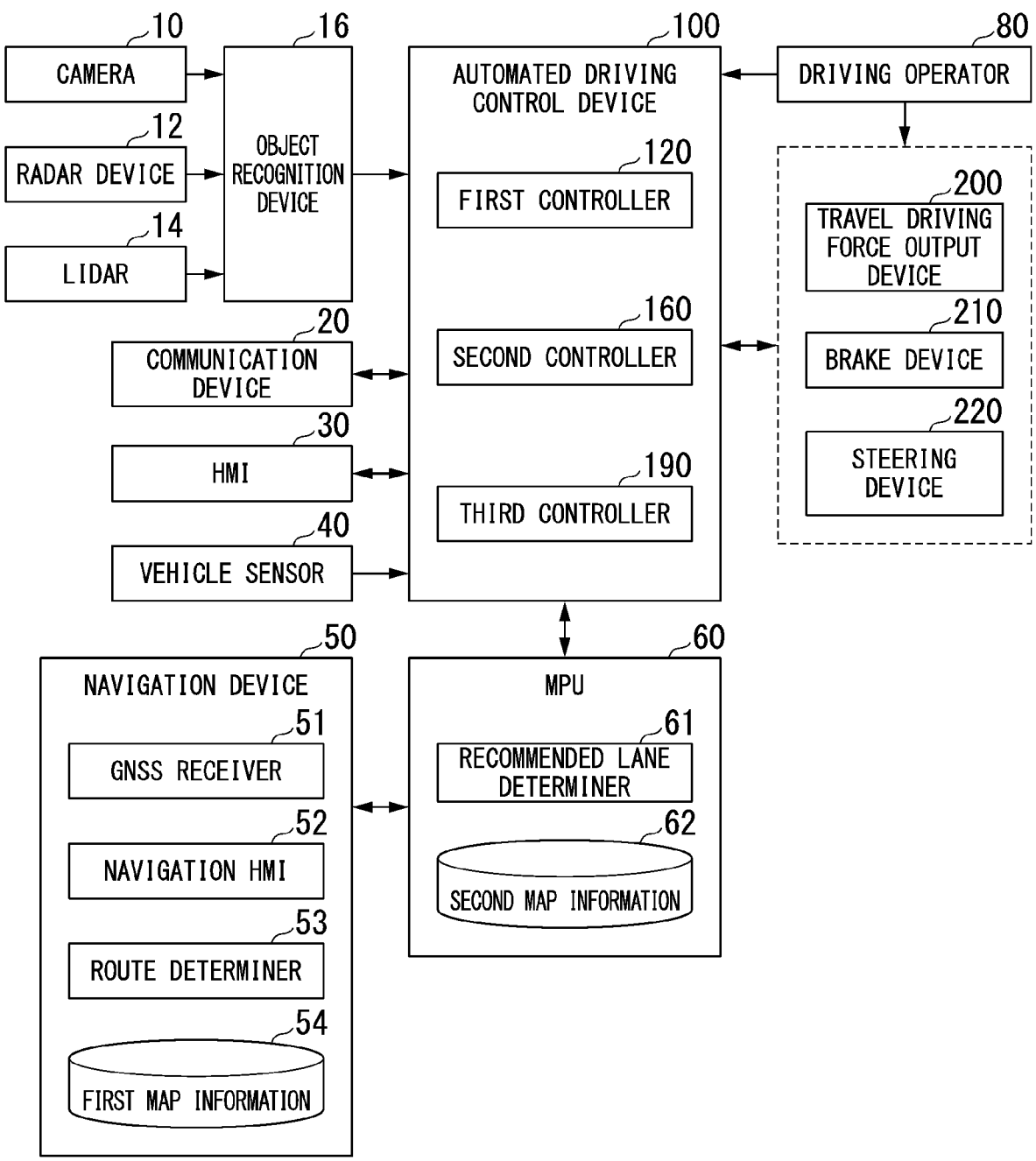
FIG. 1 is a configuration diagram of a vehicle system using a mobile object control device according to an embodiment.

FIG. 1 is a configuration diagram of a vehicle system 1 using a mobile object control device according to the embodiment. A vehicle in which the vehicle system 1 is mounted is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration illustrated in FIG. 1 is merely an example, and a part of the configuration may be omitted or other constituents may be added thereto.

The camera 10 is, for example, a digital camera using a solid-state imaging device such as a charge coupled device (CCD) or a complementary metal oxide semiconductor (CMOS). The camera 10 is attached to any place on the vehicle (hereinafter, the host vehicle M) in which the vehicle system 1 is mounted. In the case of forward imaging, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by the object to detect at least a position (a distance and orientation) of the object. The radar device 12 is attached to any place on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target based on a time from light emission to light reception. The light to be radiated is, for example, pulsed laser light. The LIDAR 14 is attached to any location on the host vehicle M.

The object recognition device 16 performs a sensor fusion process on detection results of some or all of the camera 10, the radar device 12, and the LIDAR 14 to recognize a position, type, speed, and the like of the object. The object recognition device 16 outputs recognition results to the automated driving control device 100. The object recognition device 16 may output the detection results of the camera 10, the radar device 12, and the LIDAR 14 as they are to the automated driving control device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to the occupant of the host vehicle M and receives an input operation from the occupant. The HMI 30 includes various display devices, speakers, buzzers, touch panels, switches, keys, and the like.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M based on a signal received from GNSS satellites. The position of the host vehicle M may be specified or corrected by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 based on the on-map route. The navigation device 50 may be realized, for example, by a function of a terminal device such as a smartphone or a tablet terminal possessed by the occupant. The navigation device 50 may transmit a present position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch place in the on-map route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of the operation is attached to the driving operator 80, and a detection result thereof is output to the automated driving control device 100 or some or all of the travel driving force output device 200, the brake device 210, and the steering device 220.

The automated driving control device 100 includes, for example, a first controller 120, a second controller 160, and a third controller 190. The first controller 120, the second controller 160, and the third controller 190 are realized, for example, by a hardware processor such as a central processing unit (CPU) executing a program (software). Further, some or all of these components may be realized by hardware (including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the automated driving control device 100 in advance or may be stored in a detachable storage medium such as a DVD or a CD-ROM and installed in the HDD or flash memory of the automated driving control device 100 by the storage medium (a non-transitory storage medium) being mounted in a drive device. The automated driving control device 100 is an example of a "mobile object control device".

Figure 2:
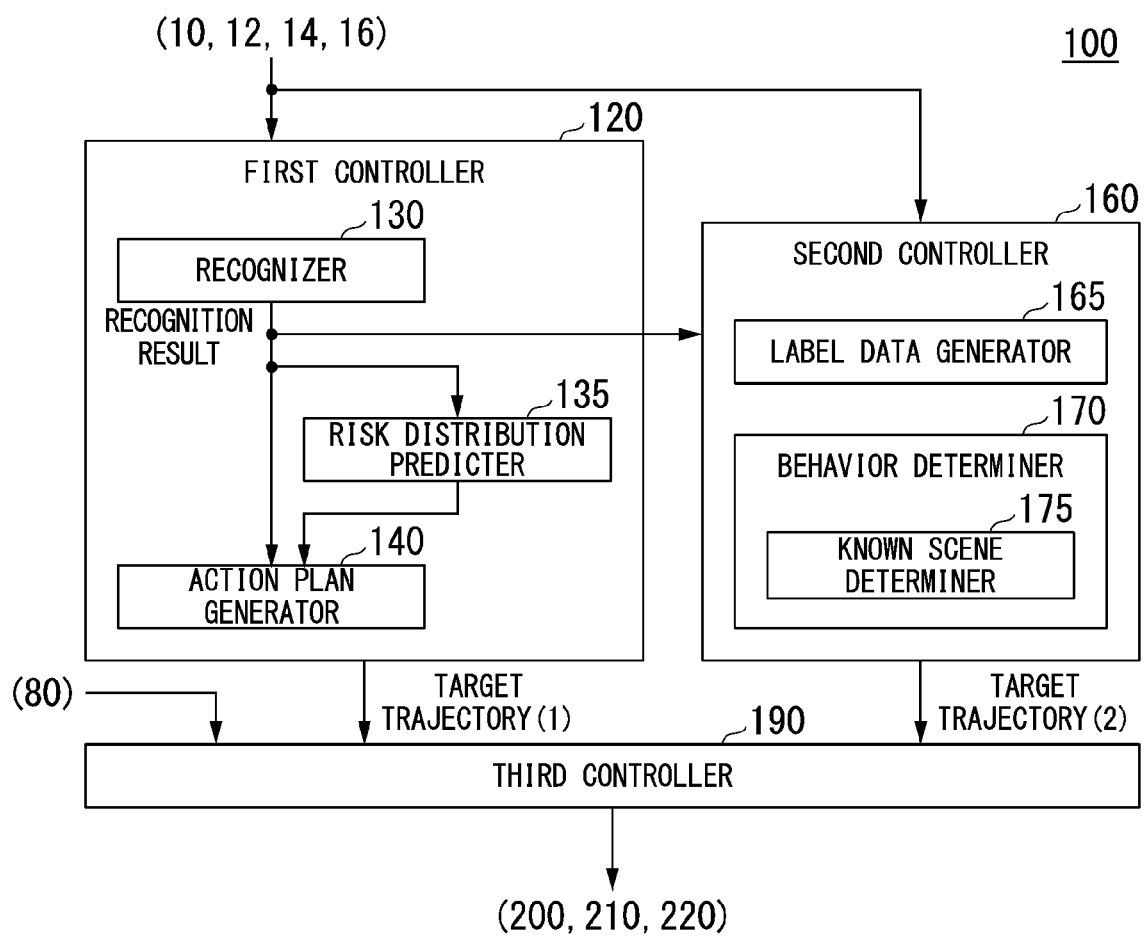
FIG. 2 is a functional configuration diagram of an automated driving control device.

FIG. 2 is a functional configuration diagram of the automated driving control device 100. The first controller 120 includes, for example, a recognizer 130, a risk distribution predicter 135, and an action plan generator 140.

The first controller 120 predicts a future action of other traffic participants (which is anything that can be moving objects such as vehicles, pedestrians, or bicycles), expresses a future position as a risk (to be described below) based on present positions of the traffic participants, also expresses a non-travelable area as a risk, and determines a future action of the host vehicle M using a sequential optimization algorithm so that the risk is minimized. The first controller 120 executes a process to be described below in the first period. The first period is, for example, a period of about 100 [msec] to hundreds of [msec]. "Execute in the first period" means to perform at least an output of a target trajectory, which is a final processing result, in the first period.

The recognizer 130 recognizes a status such as a position, speed, acceleration of an object present around the host vehicle M based on information input from the camera 10, the radar device 12, and the LIDAR 14 via the object recognition device 16. The position of the object, for example, is recognized as a position at absolute coordinates with a representative point (a centroid, a drive shaft center, or the like) of the host vehicle M as an origin, and is used for control. The position of the object may be represented by a representative point such as a centroid or a corner of the object or may be represented by a represented area. The "status" of the object may include an acceleration or jerk of the object, or an "action status" (for example, whether or not the object is changing lanes or is about to change lanes).

Further, the recognizer 130, for example, recognizes a lane (a traveling lane) in which the host vehicle M is traveling. For example, the recognizer 130 compares a pattern of road demarcation lines (for example, an arrangement of solid lines and broken lines) obtained from the second map information 62 with a pattern of road demarcation lines around the host vehicle M recognized from a captured image of the camera 10 to recognize the traveling lane. The recognizer 130 may recognize not only the road demarcation lines but also a traveling road boundary including road demarcation lines, a road shoulder, a curb, a median strip, a guard rail, or the like to recognize the traveling lane. In this recognition, the position of the host vehicle M acquired from the navigation device 50 or a processing result of an INS may be additionally considered. The recognizer 130 recognizes a temporary stop line, an obstacle, a red signal, a toll gate, and other road events.

The recognizer 130 recognizes a position or posture of the host vehicle M with respect to the traveling lane when recognizing the traveling lane. The recognizer 130 may recognize, for example, a deviation of a reference point of the host vehicle M from a center of the lane and an angle formed between a traveling direction of the host vehicle M and a line connecting along the center of the lane as a relative position and posture of the host vehicle M with respect to the traveling lane. Instead, the recognizer 130 may recognize, for example, a position of the reference point of the host vehicle M with respect to any one of side end portions (the road demarcation line or the road boundary) of the traveling lane as the relative position of the host vehicle M with respect to the traveling lane.

The risk distribution predictor 135 sets a risk that is an index value indicating a degree to which the host vehicle M should not enter or approach in an assumption plane S in which a space around the host vehicle M is represented by a two-dimensional plane viewed from above. In other words, the risk indicates a likelihood that there is an object (which is assumed to include a non-travelable area such as a road shoulder, a guardrail, and a non-white line area) (which may not be a "likelihood" in a strict sense). The risk having a greater value indicates that the host vehicle M should not enter or approach, and the risk having a value close to zero indicates that it is preferable for the host vehicle M to travel. However, this relationship may be reversed. When the mobile object is not a vehicle but a flying body such as a drone, the risk distribution predictor 135 may perform the same process in a three-dimensional space rather than the assumption plane S. The same applies to a label data generator 165.

The risk distribution predictor 135 sets the risk on the assumption plane S not only at a present point in time but also at each future point in time defined at regular time intervals such as a present time t, after Δt (time t+Δt), or after 2Δt (time t+2Δt). The risk distribution predictor 135 predicts the risk at each future point in time based on a change in a position of the moving object that is continuously recognized by the recognizer 130.

Figure 3:
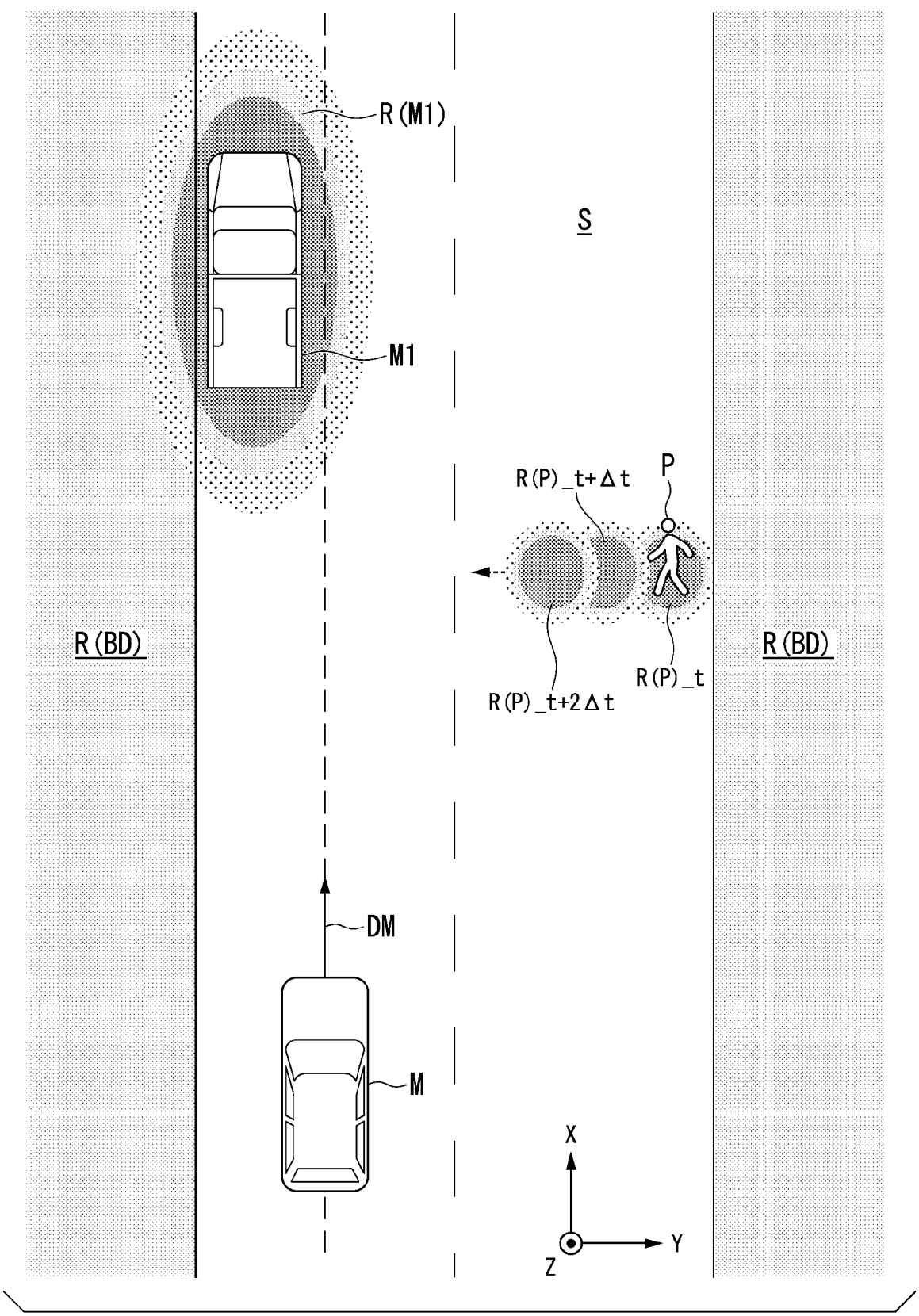
FIG. 3 is a diagram illustrating an overview of a risk that is set by a risk distribution predicter.

FIG. 3 is a diagram illustrating an overview of the risk that is set by the risk distribution predictor 135. The risk distribution predictor 135 sets a risk in which an ellipse or a circle based on the traveling direction and the speed is a contour line on the assumption plane S for traffic participants (moving objects) such as vehicles, pedestrians, and bicycles, and sets a risk having a certain value for the non-travelable area. In FIG. 3, DM indicates the traveling direction of the host vehicle M. R(M1) indicates a risk of a stopped vehicle M1, and R(P) indicates a risk of a pedestrian P. Since the pedestrian P is moving in a direction in which the pedestrian P crosses a road, a risk is set at a position at each further point in time different from a position at a present time. The same applies to moving vehicles or bicycles. R(BD) indicates a risk of a non-travelable area BD. In FIG. 3, the darkness of hatching indicates the value of the risk, and the risk is higher when the hatching is darker. The risk distribution predictor 135 may set the risk so that a value of the risk increases when a distance from the center of the lane increases.

In principle, the action plan generator 140 generates a target trajectory along which the host vehicle M will travel in the future automatically (without depending on an operation of a driver) so that the host vehicle M travels on the recommended lane determined by the recommended lane determiner 61 and passes through a portion in which the risk set by the risk distribution predictor 135 is low. The target trajectory includes, for example, a speed element. For example, the target trajectory is represented as a sequence of points (trajectory points) to be reached by the host vehicle M. The trajectory point is a point that the host vehicle M is to reach for each predetermined traveling distance (for example, several meters) along a road, and a target speed and a target acceleration at every predetermined sampling time (for example, every several tenths of a [sec]) are separately generated as a part of the target trajectory. The trajectory point may be a position that the host vehicle M is to reach at the sampling time at every predetermined sampling time. In this case, information on the target speed or the target acceleration is represented by an interval between the trajectory points. The action plan generator 140 generates a plurality of candidates for the target trajectory, calculates scores based on a viewpoint of efficiency or safety, and selects the candidate for the target trajectory having a good score as the target trajectory. Since the second controller 160 also generates the same target trajectory, the target trajectory generated by the first controller 120 may be referred to as target trajectory (1) and the target trajectory generated by the second controller 160 may be referred to as target trajectory (2) so that the target trajectories can be distinguished from each other. Target trajectory (1) is an example of the first movement plan, and target trajectory (2) is an example of the second movement plan. The first controller 120 outputs target trajectory (1) to the third controller 190.

The second controller 160 includes, for example, a label data generator 165 and a behavior determiner 170. The behavior determiner 170 includes a known scene determiner 175. The second controller 160 executes a process to be described below, in a second period. The second period is, for example, a period of about ten [msec] to tens of [msec]. "Execute in the second period" means that at least output of the target trajectory, which is a final processing result, is performed in the second period.

The label data generator 165 performs the following processing based on data input from the camera 10, the radar device 12, the LIDAR 14, and the object recognition device 16, and a recognition result of the recognizer 130. The label data generator 165 generates label data in which label information indicating different values depending on at least the presence or absence of a moving object has been imparted to each of blocks (an example of division elements) obtained by dividing an assumption plane S (which indicates a space around the vehicle) that is similar to that in the risk distribution predictor 135 into a finite number.

Figure 4:
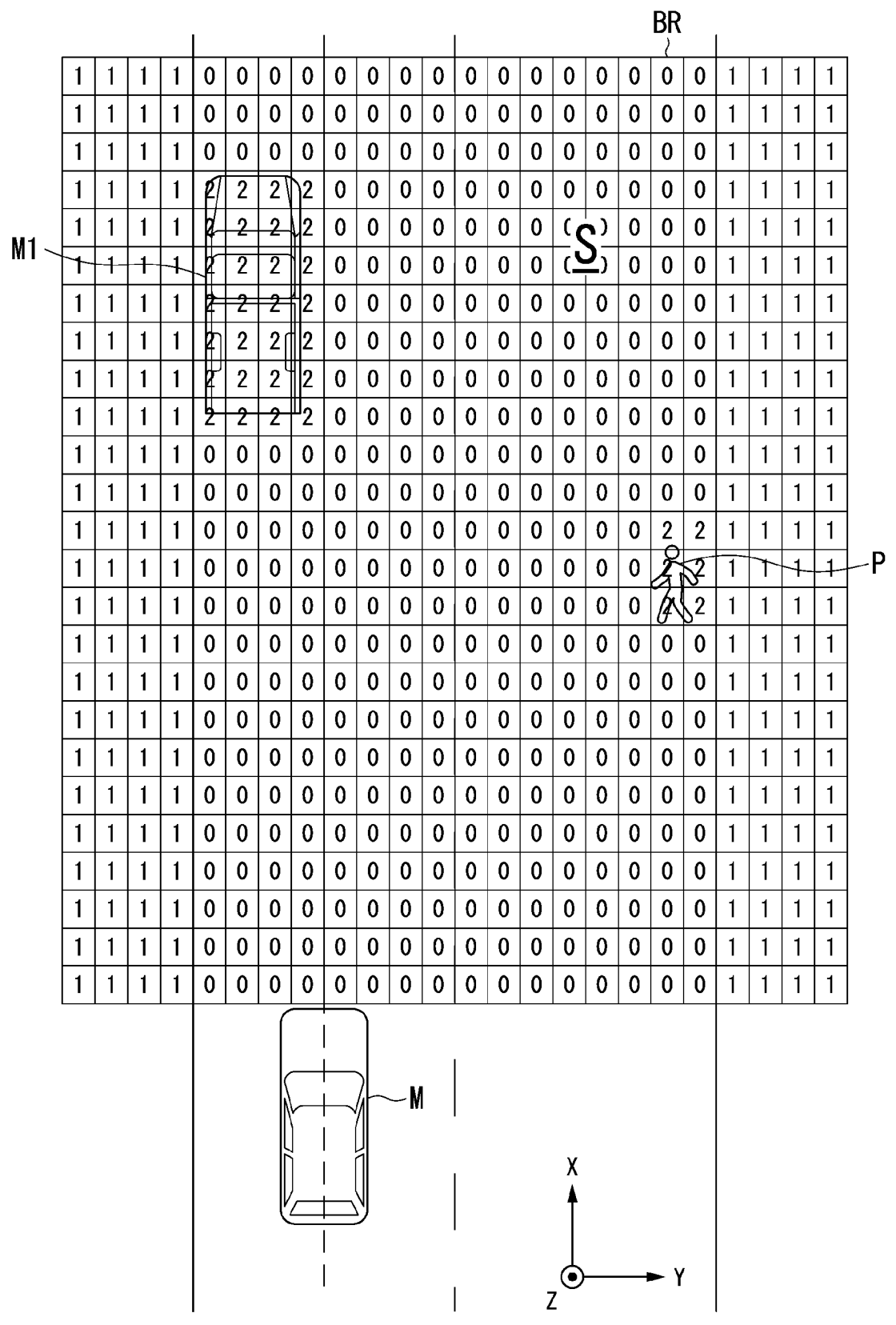

FIG. 4 is a diagram illustrating an example of the label data. The label data generator 165 assumes that at least a region on the traveling side of the host vehicle M on the assumption plane S is divided into block BRs of, for example, tens of [cm] squares. The label data generator 165 imparts label information having different values, such as "2" to the moving object, "1" to the non-travelable area, and "0" to the travelable area. In FIG. 4, the stopped vehicle is treated as a moving object and label information "2" is imparted thereto, but when a vehicle is recognized as being parked (not moving for a while), the vehicle may be treated as the non-travelable area rather than a moving object and label information "1" may be imparted thereto. Because of the necessity of avoiding approach to and a practical difference between a stationary object (the non-travelable area), such as a guardrail, and a moving object such as a pedestrian, different pieces of label information are used for the moving object and the non-travelable area, allowing the behavior determiner 170 to accurately perform a behavior determination according to the scene.

The label data generator 165, for example, performs a process of generating the label data in the second period. Here, the data input from the camera 10, the radar device 12, the LIDAR 14, and the object recognition device 16, and the recognition result of the recognizer 130 is used for recognition of the moving object and the non-travelable area. Thereamong, the recognition result of the recognizer 130 is considered to be most reliable. However, the recognizer 130 outputs the recognition result in the first period. Therefore, the label data generator 165 complements the data based on odometry information, the captured image of the camera 10, or the like between timings at which the recognition result of the recognizer 130 is acquired.

Figure 5:
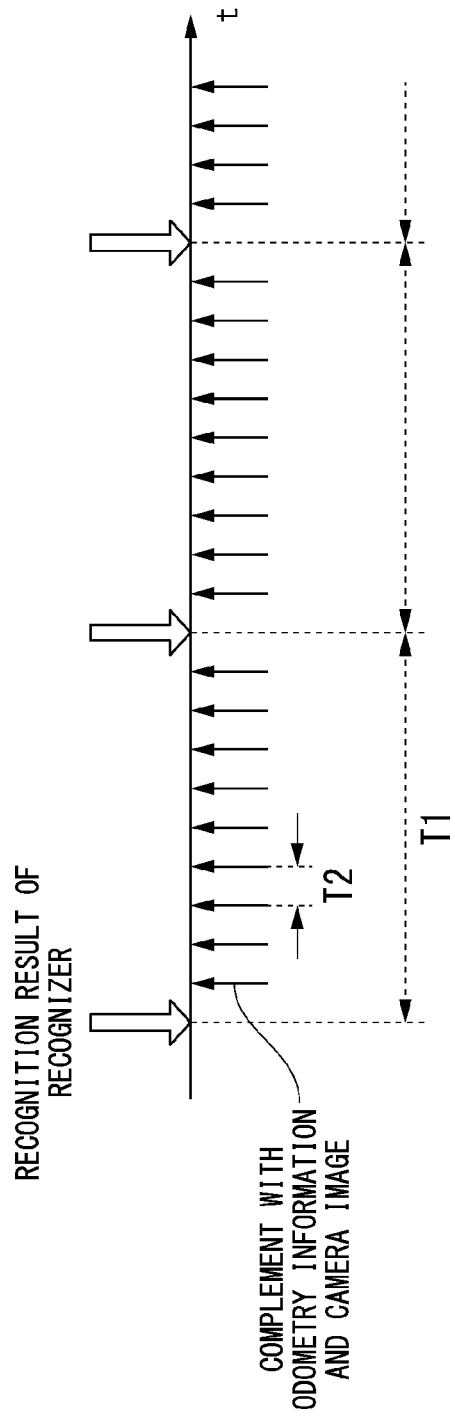
FIG. 5 is a diagram illustrating a complementing process of a label data generator.

FIG. 5 is a diagram illustrating a complementing process of the label data generator 165. The recognition result of the recognizer 130 is input in a first period T1. Since a second period T2 has a length of about ⅒ of the first period, the label data generator 165 complements the traveling direction of the host vehicle M with the odometry information and complements a lateral direction with the captured image of the camera 10 to up-convert the recognition result of the recognizer 130 and generate the label data in the second period. The odometry information is information on a traveling distance per unit time of the host vehicle M, which is obtained by integrating a speed of the host vehicle M obtained by an output of a wheel speed sensor or the like. The odometry information may be information to which information on a turning angle obtained by an output of a yaw rate sensor or the like has been added. The label data generator 165 performs, on the captured image of the camera 10, a process of tracking the moving object with a position in an image of the moving object, which is obtained by applying the recognition result of the recognizer 130 to the captured image, as a starting point, to acquire the information in the lateral direction.

When input data including the label data is input, the behavior determiner 170 inputs the input data to a model (a action determination model) learned to output a target trajectory, which is a pattern of traveling control of the host vehicle for at least curbing an approach to a moving object, acquires the target trajectory, and outputs the target trajectory to the third controller 190 to perform traveling control (movement control) of the host vehicle M.

Figure 6:
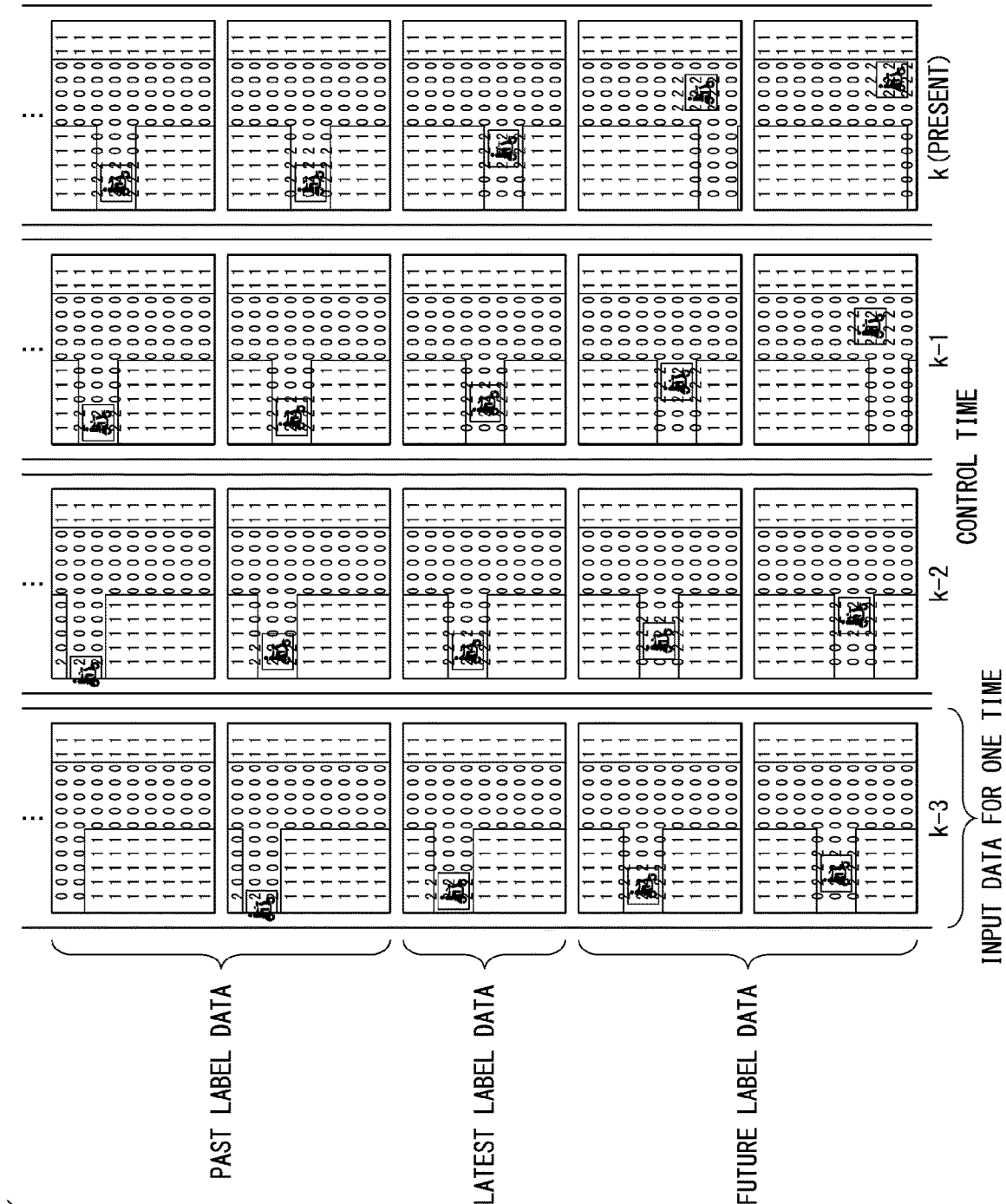
FIG. 6 is a diagram illustrating an example of a transition of input data.

The input data is, for example, data obtained by combining most recently generated label data (hereinafter, latest label data), label data generated in the past (hereinafter, past label data), and label data expected to indicate a future state (future label data) in a format of a vector, matrix, or the like. FIG. 6 is a diagram illustrating an example of a transition of the input data. In FIG. 6, a control time indicates a representation of a cycle of control in a time format. The cycle of the control arrives repeatedly in the second period. A portion corresponding to each of control times k-3, k-2, k-1, and k is input data for one time. The input data includes, for example, past label data for tens of cycles, latest label data, and future label data for several cycles. For example, past label data corresponding to a period longer in time than the first period, and future label data corresponding to a period shorter in time than the first period are included in the input data. That is, the past label data is included in the input data more than the future label data. This is based on the fact that there are many uncertain elements in a future surrounding environment. For the future label data, the label data generator 165 may generate the future label data on the assumption that a change in position of the block to which "1" or "2" is imparted from the past label data to the latest label data continues as it is or may generate the future label data based on the odometry information or information obtained from the captured image of the camera 10, as in the "complementing process" described above.

Figure 7:
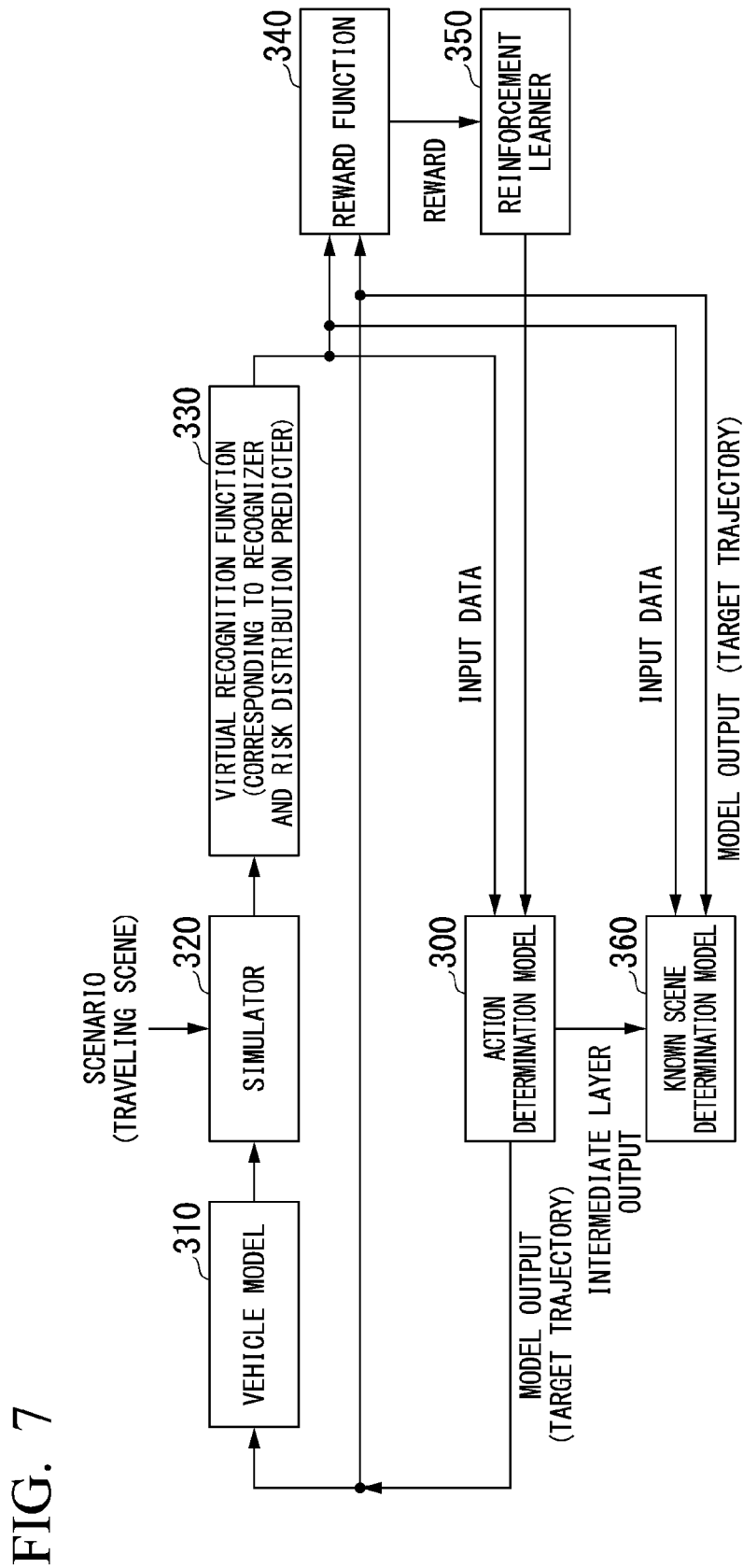
FIG. 7 is a diagram schematically illustrating a mechanism for learning an action determination model.

The action determination model used by the behavior determiner 170 is, for example, a deep neural network (DNN) learned by reinforcement learning using a simulator. FIG. 7 is a diagram schematically illustrating a mechanism for learning the action determination model. The configuration shown is a virtual software configuration that is realized by a learning device for learning a action determination model.

The input data in the format described above is input to an action determination model 300. The action determination model 300 outputs a target trajectory. The target trajectory is input to a vehicle model 310, which calculates an actual vehicle behavior. The vehicle model 310 is a model for calculating a vehicle behavior to be obtained when the target trajectory is imparted to the travel driving force output device 200, the brake device 210, and the steering device 220 of the host vehicle M, and allows hardware specifications of these devices, specifications of controllers, and information on a suspension, wheelbase, or the like of the host vehicle M, a virtual road surface situation, or the like to be reproduced.

The vehicle behavior calculated by the vehicle model 310 is input to the simulator 320. The simulator 320 generates, for example, virtual three-dimensional space information by inputting a vehicle behavior to a scenario (traveling scene) given in advance. This scenario is particularly a collection of scenes in which it is necessary to avoid approaching a moving object through braking or turning. The three-dimensional space information is input to a virtual recognition function 330. The virtual recognition function 330 is a reproduction of functions of the recognizer 130 and the risk distribution predictor 135 of the host vehicle M. The input data to be input to the action determination model 300 is generated by the recognizer 130 and the risk distribution predictor 135. Thus, an operation of the action determination model 300 is simulated.

The input data given to the action determination model 300 and the target trajectory output by the action determination model 300 are input to a reward function 340. The reward function 340 outputs a reward having a positive value when the target trajectory is more desirable while referring to the transition of the input data. For example, the reward function 340 is set to output a reward having a positive value when there is no contact with a block having label information included in the input data of "1" or "2", output a reward having a more positive value when a degree of approach to the block having label information included in the input data of "1" or "2" (which indicates a distance, a distance change speed, or the like) is not excessive, and output a reward having a negative value when an acceleration/deceleration or degree of turning (angular velocity) obtained from the target trajectory is higher. In this case, it is preferable for the presence or absence of contact with a block having label information of "2" and a degree of approach to the block to be evaluated with a weight higher than the presence or absence of contact with a block having label information of "1" and a degree of approach to the block. The reinforcement learner 350 adjusts parameters of the action determination model 300 so that the reward output by the reward function 340 becomes a more positive value. This allows the action determination model 300 to be learned.

A known scene determination model 360 is a model for learning a function of the known scene determiner 175 in the host vehicle M. The known scene determination model 360 is realized by a DNN, a low-layer neural network (for example, a radial basis function neural network), a membership function, a multidimensional response curved surface, and the like. The known scene determination model 360 determines whether or not the input data indicates a traveling scene (known scene) similar to a traveling scene already learned by the action determination model 300. "Similar" means that traveling scenes are substantially the same even though the traveling scenes are not exactly the same (for example, the traveling scenes match at a level (grain size) that "a bicycle is entering from a direction orthogonal to the traveling direction of the host vehicle M on a T-junction, a width of a road on which the host vehicle M travels is about 3 [m], and a width of a road on which the bicycle has entered is about 2 [m]"). The known scene determination model 360, for example, is learned to output 1 when a determination is made that the input data indicates a known scene, and 0 when a determination is made that the input data does not indicate the known scene. Instead of the above, the known scene determination model 360 may extract a feature quantity from the input data of the action determination model 300 and/or an output of an intermediate layer, and perform the above determination based on a side on which the feature quantity is present with respect to a hyperplane indicating a learning completion condition.

The known scene determiner 175 uses the known scene determination model 360 to determine whether or not the input data input to the behavior determiner 170 indicates the known scene.

Figure 8:
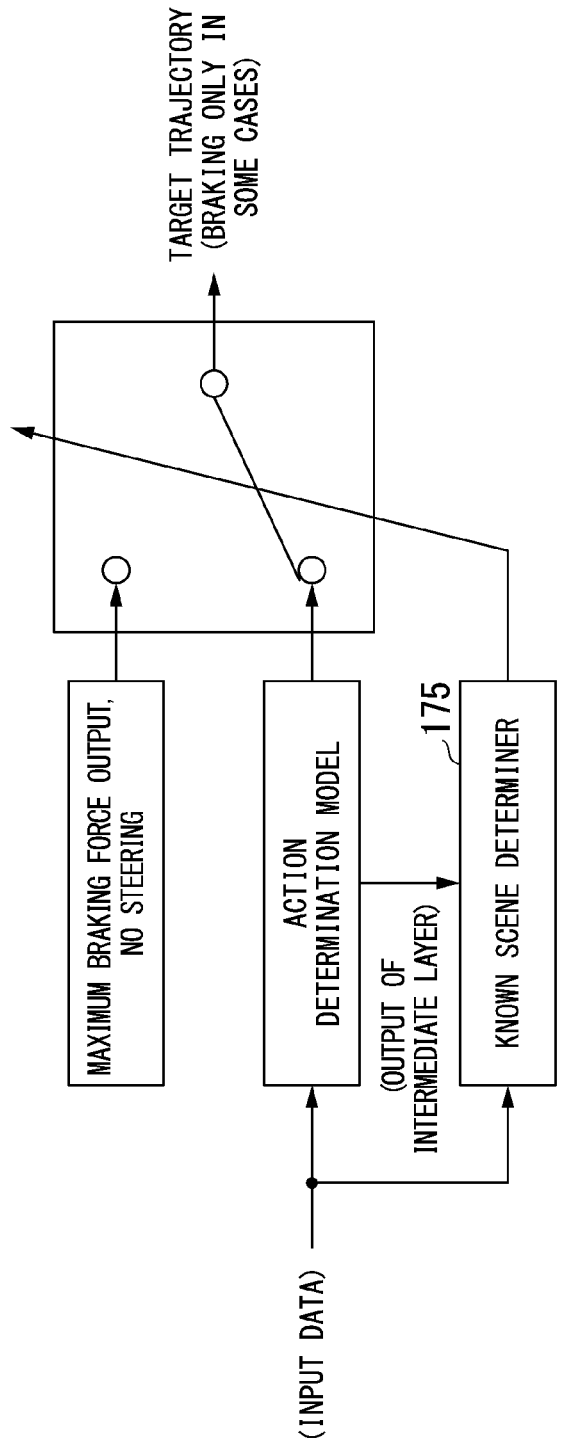
FIG. 8 is a diagram schematically illustrating processing content of a behavior determiner.

FIG. 8 is a diagram schematically illustrating processing content of the behavior determiner 170. The behavior determiner 170 outputs any one of a target trajectory that is an output of the action determination model, a target trajectory in which a maximum braking force (for example, about 0.3 [G]) is output without steering, and a target trajectory in which a degree of steering control is limited in comparison with the target trajectory that is the output of the action determination model. The behavior determiner 170 switches output content to output the target trajectory that is the output of the action determination model when the known scene determiner 175 determines that the input data indicates the known scene, and output the target trajectory in which the maximum braking force is output without steering when the known scene determiner 175 determines that the input data does not indicate the known scene. Accordingly, when the host vehicle M encounters a traveling scene that has never been learned, the action determination model outputs an unexpected target trajectory, thereby curbing occurrence of an inappropriate behavior in the host vehicle M.

As illustrated in FIG. 2, the third controller 190 controls the travel driving force output device 200, the brake device 210, and the steering device 220 so that the host vehicle M passes at a scheduled time defined in a target trajectory based on any one of target trajectory (1) generated by the first controller 120 and target trajectory (2) generated by the second controller 160 or the target trajectory obtained by integrating target trajectory (1) and target trajectory (1). When the driving operator 80 is operated with an amount of operation larger than a reference, the third controller 190 performs, for example, a process of stopping automated driving performed by the first controller 120 and the second controller 160 and switching driving to manual driving.

The third controller 190 controls the travel driving force output device 200, the brake device 210, and the steering device 220, with the target trajectory (2) generated by the second controller 160 being in preference to the target trajectory (1) generated by the first controller 120, at least in a predetermined scene. In the second controller 160, the action determination model has been learned to output an emergency action flag, for example, when there is a moving object approaching at a relatively high speed and an avoidance action is required, and the third controller 190 controls the travel driving force output device 200, the brake device 210, and the steering device 220 based only on target trajectory (2) when the emergency action flag is input, and controls the travel driving force output device 200, the brake device 210, and the steering device 220 based only on target trajectory (1) when the emergency action flag is not input. Instead, for example, when there is a moving object approaching at a relatively high speed and an avoidance action is required, the second controller 160 may generate target trajectory (2), and otherwise, an action determination model that does not generate target trajectory (2) has been learned, and the third controller 190 may control the travel driving force output device 200, the brake device 210, and the steering device 220 based only on target trajectory (2) when target trajectory (2) is input and control the travel driving force output device 200, the brake device 210, and the steering device 220 based only on target trajectory (1) when target trajectory (2) is not input.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and an electronic control unit (ECU) that controls these. The ECU controls the above configuration according to information input from the third controller 190 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the third controller 190 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder, as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the third controller 190 or information input from the driving operator 80 to change the direction of the steerable wheels.

[Conclusion]

Since the first controller 120 performs a process of determining the target trajectory so that the vehicle passes through a low-risk portion and selecting the target trajectory from the plurality of candidates for the target trajectory, a calculation load may be high, and it may be difficult to perform action updating at a control period of about tens of [ms] required for emergency avoidance with performance of a processor that can be mounted in reality at the time of filing. On the other hand, since the second controller 160 generates the target trajectory using the action determination model (a learned DNN) that can output results at high speed, it is possible to perform action updating in a control period of about tens of [ms] required for emergency avoidance. Therefore, according to the embodiment described above, it is possible to rapidly perform necessary control according to a scene.

On the other hand, control using the action determination model is to determine an action in a feedforward controlling manner based on an experience obtained from a traveling scene learned in the past, that is, an action from which the most positive reward is obtained among actions performed with respect to the moving object. Therefore, when an action pattern of the moving object is unknown or a traveling scene itself is unknown, an unexpected vehicle behavior is likely to occur. On the other hand, the second controller 160 of the embodiment outputs the maximum braking force without steering when the determination is made that the input data does not indicate the known scene, thereby preventing a situation such as the host vehicle M riding on a curb or a sidewalk due to steering avoidance.

In the embodiment, the input data is generated to include the past label data and the future label data. This makes it possible to determine an action from a longer-term viewpoint than control based on a momentary state. Even when there is an abnormal value in any of the latest, past, and future label data, it is possible to cancel the abnormal value in other parts and to realize robust stability.

[Hardware Configuration]

Figure 9:
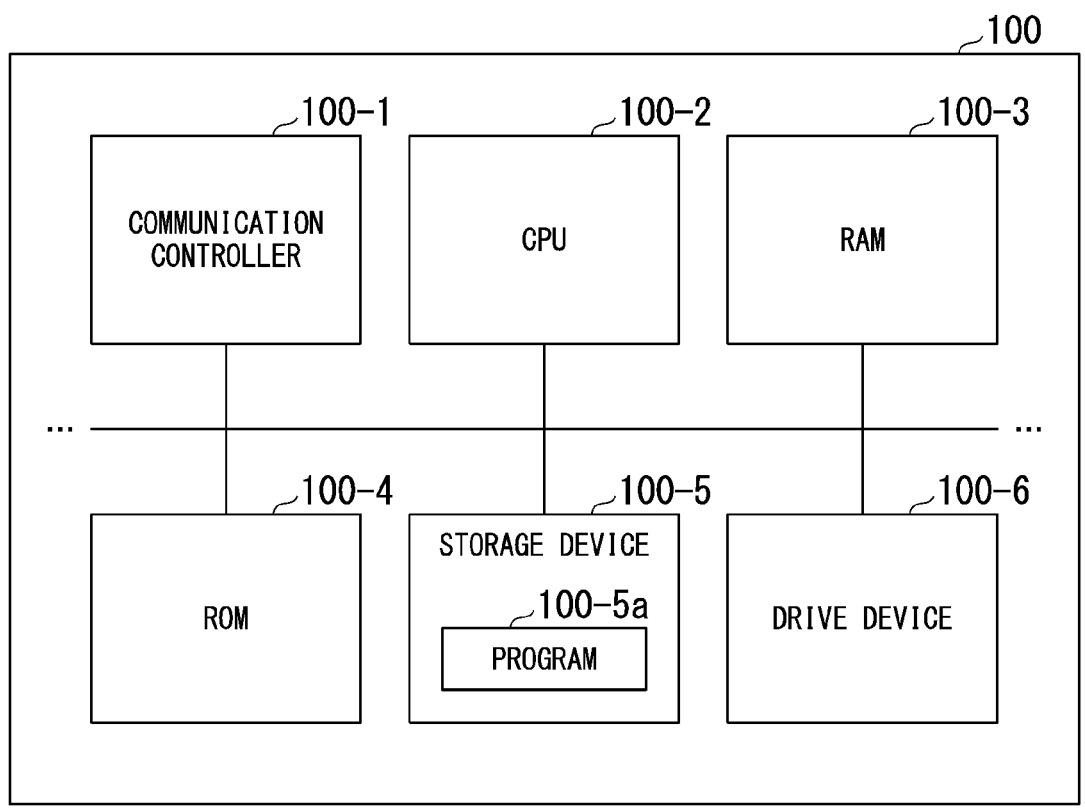
FIG. 9 is a diagram illustrating an example of a hardware configuration of the automated driving control device of the embodiment.

FIG. 9 is a diagram illustrating an example of a hardware configuration of the automated driving control device 100 of the embodiment. As illustrated in FIG. 9, the automated driving control device 100 has a configuration in which a communication controller 100-1, a CPU 100-2, a random access memory (RAM) 100-3 that is used as a work memory, a read only memory (ROM) 100-4 that stores a boot program or the like, a storage device 100-5 such as a flash memory or a hard disk drive (HDD), a drive device 100-6, and the like are connected to each other by an internal bus or a dedicated communication line. The communication controller 100-1 communicates with components other than the automated driving control device 100. A program 100-5a to be executed by the CPU 100-2 is stored in the storage device 100-5. This program is developed in the RAM 100-3 by a direct memory access (DMA) controller (not illustrated) or the like and executed by the CPU 100-2. Thereby, some or all of the first controller 120, the second controller 160, and the third controller 190 are realized.

In the embodiment described above, the description has been made on the premise that the mobile object control device is mounted in the mobile object (a vehicle). The present invention is not limited thereto and the mobile object control device may be a server device capable of wireless and/or wired communication with a communication device mounted in the mobile object, and may be a device that transmits the first movement plan or the second movement plan to the communication device of the mobile object through communication. In this case, the mobile object has a function corresponding to the third controller 190, and specifically controls devices such as the travel driving force output device 200, the brake device 210, and the steering device 220 based on the first movement plan or the second movement plan acquired from the communication device. Alternatively, the server device may have a function corresponding to the third controller 190, and transmit a control instruction, which is given to the devices such as the travel driving force output device 200, the brake device 210, and the steering device 220, to the communication device of the mobile object through communication.

In the embodiment described above, it is assumed that the mobile object control device is applied to the automated driving control device 100, and the first controller 120 generates the target trajectory for automated driving. Instead, the mobile object control device may be applied to a driving assistance control device that performs driving assistance control including elements of manual driving in at least a part thereof, and the first controller may perform driving assistance represented by adaptive cruise control (ACC) or a lane keeping assist system (LKAS).

The embodiment described above can be expressed as follows.

A mobile object control device including
a storage device that stores a program, and
a hardware processor,
wherein mobile object control device is configured so that the hardware processor executes
a first process of recognizing a surrounding situation of a mobile object based on an output of a detection device having a space around the mobile object as a detection range and generating a first movement plan for the mobile object in a first period based on the recognized surrounding situation of the mobile object, and
a second process of generating a second movement plan for the mobile object in a second period shorter than the first period, by executing the program included in the storage device, and
the second process is a process of generating, in the second period, label data in which label information indicating different values depending on at least the presence or absence of a moving object is imparted to each of division elements obtained by dividing the space around the mobile object into a finite number, and generating the second movement plan based on the label data.

The embodiment described above can also be expressed as follows.

A mobile object control device including:
a storage device that stores a program, and
a hardware processor,
wherein the hardware processor is configured to perform movement control for a mobile object based on an output of a detection device having a space around the mobile object as a detection range by executing the program stored in the storage device, and
the movement control for the mobile object includes
inputting input data based on the output of the detection device to a model learned to output a movement plan for curbing contact with a moving object when input data is input, to acquire the movement plan, and determining whether or not the input data input to the model indicates a known scene, performing movement control for the mobile object based on the movement plan output by the model when a determination is made that the input data indicates the known scene, and performing movement control for exclusively outputting a braking force without performing steering control for the mobile object, or movement control limited in comparison with a case in which a determination is made that a degree of the steering control indicates the known scene when a determination is made that the input data does not indicate the known scene.

While forms for carrying out the present invention have been described using the embodiments, the present invention is not limited to these embodiments at all, and various modifications and substitutions can be made without departing from the gist of the present invention.

What is claimed is:

1. A mobile object control device comprising:
a storage device configured to store a program; and
a hardware processor,
wherein the hardware processor
recognizes, as a recognition result, a surrounding situation of a mobile object based on an output of a detection device having a space around the mobile object as a detection range,
sets index values, each of the index values indicating a degree to which the mobile object should not enter or approach based on the surrounding situation of the mobile object,
generates a first movement plan for the mobile object in a first period so that the mobile object passes through positions in which an index value is minimized, and
generates a second movement plan for the mobile object in a second period shorter than the first period, by executing the program stored in the storage device, and
wherein when the hardware processor generates the second movement plan, the hardware processor generates label data in which label information indicating different values depending on at least the presence or absence of a moving object is imparted to each of division elements obtained by dividing the space around the mobile object into a finite number, and generates the second movement plan by inputting the generated label data to a model learned to output a movement plan for avoiding contact with the moving object without taking the index value into account, and
wherein the hardware processor uses the second movement plan for movement control for the mobile object in preference to the first movement plan at least in a predetermined scene.

2. The mobile object control device according to claim 1, wherein the hardware processor imparts the label information having different values to the moving object, a non-travelable area, and a travelable area in the label data.

3. The mobile object control device according to claim 1, wherein the hardware processor generates the label data in a second period.

4. The mobile object control device according to claim 1, wherein the input data includes latest label data generated most recently, past label data generated in the past, and future label data expected to indicate a future state.

5. The mobile object control device according to claim 4, wherein the input data includes the past label data corresponding to a period longer in time than the future label data.

6. The mobile object control device according to claim 4, wherein the input data includes the past label data corresponding to a period longer in time than the first period.

7. The mobile object control device according to claim 4, wherein the input data includes the future label data corresponding to a period shorter in time than the first period.

8. The mobile object control device according to claim 1, wherein the hardware processor determines whether or not the input data indicates a known scene, performs movement control for the mobile object based on the second movement plan output by the model when the hardware processor determines that the input data indicates the known scene, and performs movement control for exclusively outputting a braking force without performing steering control for the mobile object, or movement control limited in comparison with a case in which the hardware processor determines that a degree of the steering control indicates the known scene when the hardware processor determines that the input data does not indicate the known scene.

9. The mobile object control device according to claim 1, wherein the model is a model in which parameters are learned by reinforcement learning based on a reward calculated using a reward function for evaluating an output of the model.

10. The mobile object control device according to claim 1,
wherein, the recognition result is generated in the first period, and for generating the label data in a second period, the processor complements the traveling direction of the mobile object with an odometry information and complements a lateral direction with the captured image of a camera to up-convert the recognition result.

11. A mobile object control method using a computer comprising:
executing a first process of recognizing, as a recognition result, a surrounding situation of a mobile object based on an output of a detection device having a space around the mobile object as a detection range, setting index values, each of the index values indicating a degree to which the mobile object should not enter or approach based on the surrounding situation of the mobile objet, and generating a first movement plan for the mobile object in a first period so that the mobile object passes through positions in which an index value is minimized; and
executing a second process of generating a second movement plan for the mobile object in a second period shorter than the first period,
wherein the second process is a process of generating, in the second period, label data in which label information indicating different values depending on at least the presence or absence of a moving object is imparted to each of division elements obtained by dividing the space around the mobile object into a finite number, and generating the second movement plan by inputting the generated label data to a model learned to output a movement plan for avoiding contact with the moving object without taking the index value into account,
wherein the second movement plan for movement control for the mobile object is used in preference to the first movement plan at least in a predetermined scene.

12. The mobile object control method according to claim 11,
wherein, the recognition result is generated in a first period, and
the generation of the label data in a second period includes complementing the traveling direction of the mobile object with an odometry information and complementing a lateral direction with the captured image of a camera to up-convert the recognition result.

\* \* \* \* \*